United States Patent [19]

Bors et al.

[11] Patent Number: 5,767,199
[45] Date of Patent: Jun. 16, 1998

[54] SHELF STABLE COMPOSITIONS CONTAINING ACETOACETATE FUNCTIONAL POLYMER AND POLYFORMAL

[75] Inventors: Daniel Arthur Bors, Warminster; William David Emmons, Huntingdon Valley, both of Pa.

[73] Assignee: Rohm and Hass Company, Phila., Pa.

[21] Appl. No.: 921,537

[22] Filed: Jul. 29, 1992

[51] Int. Cl.⁶ .............................. C08L 61/00; C08L 61/02
[52] U.S. Cl. ..................... 525/153; 525/300; 525/303; 525/304; 525/305; 526/216
[58] Field of Search ........................ 528/129, 230; 526/216, 224; 560/178; 525/153, 303, 304, 305, 300

[56] References Cited

U.S. PATENT DOCUMENTS 2,449,469  11/1948  Gresham et al. .................. 528/230
4,960,924  10/1990  Bors et al. .......................... 526/216

OTHER PUBLICATIONS

W.C. Lloyd ("Autoxidations" in *Methods in Free-Radical Chemistry*, E. S. Huyser (Ed.), vol. 4, Marcel Dekkor, New York, 1973).

*Primary Examiner*—James J. Seidleck
*Attorney, Agent, or Firm*—Ronald D. Bakule, Patent Agent

[57] ABSTRACT

An air-curing composition is disclosed which contains an acetoacetate functional polymer and an end-blocked polyformaldehyde chain. The composition is stable to reaction until the formaldehyde is released from the polyformaldehyde chain.

2 Claims, No Drawings

SHELF STABLE COMPOSITIONS CONTAINING ACETOACETATE FUNCTIONAL POLYMER AND POLYFORMAL

BACKGROUND OF THE INVENTION

The invention relates to the air cure of polymer compositions which contain acetoacetate functional groups.

Aqueous formaldehyde is known to be an excellent and rapid crosslinker for acetoacetate polymers and specifically for vinyl emulsion polymers with pendant acetoacetate groups. However, the crosslinking reaction is very fast and is not controllable, so acetoacetate emulsions to which formaldehyde has been added are very poor film formers and are not generally useful in coatings compositions.

SUMMARY OF THE INVENTION

The invention provides air curing compositions which contain an acetoacetate functional polymer and an end-blocked polyformaldehyde chain. These compositions provide a delayed cure mechanism which can be used to prepare coating compositions having a range of desired properties. The formaldehyde functionality in the polyformaldehyde chain is not available for reaction with the acetoacetate polymer functionality until the end-blocking group is removed. The invention provides compositions which flow during film formation and then cure through the reaction of the acetoacetate with the aldehyde released from the polyaldehyde chain.

The preferred polymers for use in this invention are vinyl polymers with pendant acetoacetate groups. The term "pendant" is used in the specification to mean "attached to the polymer backbone and available for further reaction." Pendant should not be read in the strict sense which would exclude the attachment of such groups at the termini of a polymer chain. Thus, polymer having acetoacetate functionality introduced on the chain end by an acetoacetate functional mercaptan as taught in U.S. Pat. No. 4,960,924 would be useful in this invention. Generally, the pendant acetoacetate groups are attached to the polymer backbone via an organic divalent radical $R^1$ which in turn is attached to the acetoacetate moiety or by a trivalent organic radical $R^2$ bearing two acetoacetate groups.

The acetoacetate functional polymers can be prepared by means known in the art. A preferred method is polymerization through incorporation which includes an acetoacetate functional monomer. A preferred monomer is acetoacetoxyethyl methacrylate which is conveniently referred to throughout this specification as AAEM, shown below.

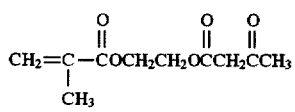

Examples of other monomers useful for introduction of acetoacetate functionality are acetoacetoxyethyl acrylate, acetoacetoxypropyl methacrylate, allyl acetoacetate, acetoacetoxybutyl methacrylate, 2,3-di(acetoacetoxy)propyl methacrylate and the like. In general, any polymerizable hydroxy functional monomer can be converted to the corresponding acetoacetate by reaction with diketene or other suitable acetoacetylating agent (See e.g. *Comparison of Methods for the Preparation of Acetoacetylated Coating Resins*, Witzeman, J. S.; Dell Nottingham, W.; Del Rector, F. J. Coatings Technology; Vol. 62, 1990, 101. (and references contained therein)).

The vinyl polymers of this invention are most often copolymers of the acetoacetate functional monomer and other monomers. Examples of useful comonomers are simple olefins such as ethylene, alkyl acrylates and methacrylates where the alkyl group has 1 to 20 carbon atoms (more preferably 1 to 8 carbon atoms), vinyl acetate, acrylic acid, methacrylic acid, acrylonitrile, styrene, isobornyl methacrylate, acrylamide, hydroxyethyl acrylate and methacrylate, hydroxypropyl methacrylate and acrylate, N-vinyl pyrolidinone, butadiene, isoprene, vinyl halides such as vinyl chloride and vinylidene chloride, alkyl maleates, alkyl fumarates, fumaric acid, maleic acid, itaconic acid, etc. It is also possible and sometimes desirable to include low levels of divinyl or polyvinyl monomers such as glycol polyacrylates, allyl methacrylate, divinyl benzene, etc. to introduce a controlled amount of gel in the latex particle. It is important, however, to be sure that when this is done, the quality of the film formation is not seriously impaired.

The acetoacetate functional polymer may contain from about 0.5% to 100% of the acetoacetate functional monomer by weight. In any application, the amount of acetoacetate functional monomer required will vary from case to case depending upon the desired degree of cure necessary in the particular end use application. Generally, however, the acetoacetate monomer concentration will be between 1 and 40%. Conventional coatings will usually contain from about 2.5 to 20% acetoacetate monomer by weight. Polymers having a molecular weight of from 1000 to over one million can be used. The lower molecular weight polymers should contain a sufficiently high level of acetoacetate to maximize cure. For example, a copolymer of AAEM having a molecular weight under 10,000 would typically contain 30% or more of AAEM.

Generally, the vinyl polymer is prepared as a dispersion or emulsion polymer in water by a suitable free radical initiated polymerization technique, using a free radical initiator and appropriate heating. Since a film forming polymer is required, useful emulsion polymers will generally have glass transition temperatures under 60° C. since these polymers with coalescent will form good quality films at ambient temperatures. If soluble polymers are used in the film formation process, polymers of higher glass transition temperature are readily used since they are film-forming.

In certain aspects of the invention, polymerization in an aqueous medium, and in particular, aqueous emulsion polymerization, is used to prepare the polymer. Conventional dispersants can be used (e.g. anionic and/or nonionic emulsifiers such as alkali or ammonium alkyl sulfates, alkyl sulfonic acids, and fatty acids, oxyethylated alkyl phenols, etc.) The amount of dispersant used is usually 0.1 to 6% by weight based on the weight of total monomer. Either thermal or redox initiation processes may be used. Conventional free radical initiators may be used (hydrogen peroxide, t-butyl hydroperoxide, ammonium and/or alkali persulfates, etc.); typically 0.05 to 3.0% by weight based on the weight of total monomer. Redox systems using the same initiators coupled with a suitable reductant (for example: isoascorbic acid, sodium bisulfite) can be used at similar levels. Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

The invention may also be practiced using a solvent soluble or water soluble polymer. When this is desired, the polymer may be prepared directly in water if the monomer mix is water soluble or, as is most often the case, the polymerization solvent is a water miscible solvent such as isopropanol, butyl cellosolve, propylene glycol, etc. In this case, water may be included in the polymerization mixture or post added after the polymerization is complete. In some cases, the polymer is prepared in a conventional organic solvent such as xylene or toluene. When organic solvent is employed with or without water, it is convenient to use a soluble organic free radical initiator such as azo-bis-isobutyronitrile, t-butyl-peroctoate, or benzoyl peroxide and whatever heat is convenient to assure smooth copolymerization. Another route to preparation of a water soluble polymer for this invention is to prepare a vinyl dispersion polymer having enough acrylic or methacrylic acid or other polymerizable acid monomer (usually greater than 10%) so that the emulsion polymer can be solubilized by addition of ammonia or other base. Water soluble polymers of this type are advantageously used as blends with conventional dispersion polymers, preferably those which also have pendant acetoacetate functionality. Systems of this type form a completely cured matrix when exposed to a free radical flux. The blend of alkali soluble resin and latex polymer has a particularly advantageous property combination of gloss and rheology and is useful in coatings and printing ink applications.

In another embodiment of this invention, an aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such dispersions are well known in the art. It is sometimes advantageous to introduce some crosslinking or gel structure by the sequential polymerization process in the core via low levels of a crosslinking monomer such as allyl methacrylate. The lightly crosslinked core does not adversely affect film formation and does in some cases result in better coatings, particularly when the pendant acetoacetate is concentrated in the shell.

As indicated above, the major use for this technology is for curing vinyl polymers dispersed or dissolved in aqueous solvents. Unfortunately, vinyl polymers containing pendant acetoacetate are prone to hydrolysis in water particularly on heat aging. The hydrolysis occurs at nearly any pH and yields acetoacetic acid,

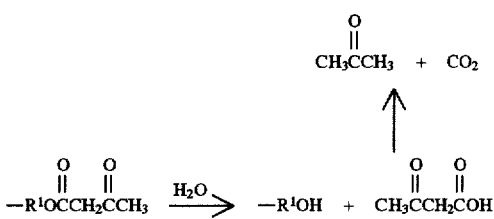

which in turn decomposes to acetone and carbon dioxide.

We have found, however, that this problem may be eliminated by treating the aqueous acetoacetate polymer, after preparation and neutralization, with one molar equivalent of ammonia or a primary amine such as ethanolamine, methyl amine, or isopropyl amine. Typically, the polymer is first neutralized to a basic pH, preferably a pH greater than 9, before adding the one molar equivalent for enamine formation. Under these conditions the enamine is formed. The reaction to form the enamine is generally rapid with the rate of formation increasing with temperature. In general, enamine formation is complete within 24 hours. An alternative approach is to raise the pH to about 9, allow the system to equilibrate, and readjust the pH to about 9 to replace the amine consumed by enamine formation. The enamine is stable to hydrolysis.

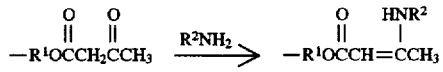

The amount of ammonia or amine used should be at least equivalent to the amount of acetoacetate in the polymer. Sterically hindered primary amines such as t-butyl amine and aromatic amines such as aniline are not suitable because of incomplete enamine formation. The enamine formation is a reversible reaction, so that as the ammonia or amine evaporates after film formation and in exposure to the atmosphere, the pendant acetoacetate is regenerated in the film. The wet composition is quite storage stable, however, as long as it is stored under conditions (such as a closed container) where the amine/ammonia cannot evaporate. Cure of these films is not impeded by the presence of the ammonia or amine which normally evaporates.

Another approach to preparation of vinyl polymers containing equivalent pendant enamine functionally is to use preformed enamine monomers derived from the appropriate amine and the acetoacetate monomer. In this case, the pH must be kept on the alkaline side during polymerization to avoid hydrolysis of the enamine back to the acetoacetate.

End-Blocked Polyaldehyde Chain

The end-blocked polyformaldehyde chain can be produced by known methods, such as those described in U.S. Pat. No. 2,449,469 and Webb, R. F.; Duke, A. J.; Smith, L. A. S., *J. Chem. Soc.*, 1962 p. 4307. A preferred end-blocked polyformaldehyde is a polyformaldehyde acetal chain, which can be prepared by reaction of a quantity of formaldehyde with two molecules of an alcohol that contains an autoxidizable group. Preferably, the autoxidizable end group has oxidizibilities as defined by W. C. Lloyd ("Autoxidations" in *Methods in Free-Radical Chemistry*, E. S. Huyser (Editor), Vol. 4, Marcel Dekkor, New York, 1973) of greater than $1 \times 10^{-3}$. Examples of such alcohols include benzyl alcohol p-methoxy-benzyl alcohol, benzhydrol, cinnamyl alcohol, 2,4-hexadien-1-ol, allyl alcohol and crotyl alcohol.

The molecular weight of the chain is a function of the number of formaldehydes per chain. Higher numbers of formaldehyde tend to cause the formation of highly insoluble materials. Therefore, in practice, the number of formaldehydes per chain is limited to about 1 to 14, depending on the end-blocking alcohol. Liquid end-blocked polyformaldehyde chains that are soluble in the polymer solution are preferred. A generic example of these polyformals is shown below.

where $R_1$ is the monovalent residue of an easily oxidizable alcohol such as benyl alcohol, p-methoxybenzyl alcohol, benylhydrol, cinnamyl alcohol, 2,4-hexadien-1-ol, alkyl alcohol, and crotyl alcohol. In the formula, x and z are integers from one to seven and y is zero or 1. $R_2$ is a divalent organic radical.

The resulting blocked polyaldehyde is stable at basic pH and the polyaldehyde chain is formulated with an acetoacetate polymer to produce a composition having a pH in this range. When the composition is applied to a substrate, atmospheric oxygen is believed to autoxidize the active methylene on the end group of the polyaldehyde to form a hydroperoxide, as shown in step 1 of the following reaction. (The following illustration represents an end-blocked polyaldehyde chain which contains three aldehyde units, the case where x+z=3 in the general formula above and y=0). In this example, the terminal R group is a vinyl substiuent.

The coupled product represents a crosslink in the polymer composition.

The two reactions in the described mechanism proceed readily when the pH is basic; at lower pH hydrolysis of the polyformal to produce the starting materials will likely occur. Regardless of the actual mechanism at work, we have experimentally demonstrated that the reactants crosslink readily. The present invention produces a system which delays this crosslinking by protecting the aldehydes from immediate reaction with acetoacetate by introducing the aldehyde reactant in the form of a reversibly end-blocked polyaldehyde chain.

The rate of cure of the composition can be accelerated using metal driers. This component may be any polyvalent metal containing complex or salt that catalyzes the oxidative curing of drying oils or drying oil modified alkyd resins. Examples are polyvalent metal salts containing cobalt, calcium, manganese, copper, zinc, iron and zirconium as the cation. Simple salts such as the halides, nitrates and sulfates may be used, but in many cases an organic anion such as the acetate, naphthenate or the acetoacetonate is used for solubility or compatibility reasons.

The amount of drier required is low and is generally in the range of 0.01 to 1% metal content by weight of the film forming composition. The autoxidation process will take place without drier but it is impractically slow, particularly at room temperature. Finally, if a cobalt drier is used and true one pack stability is desired, it may be useful to include a

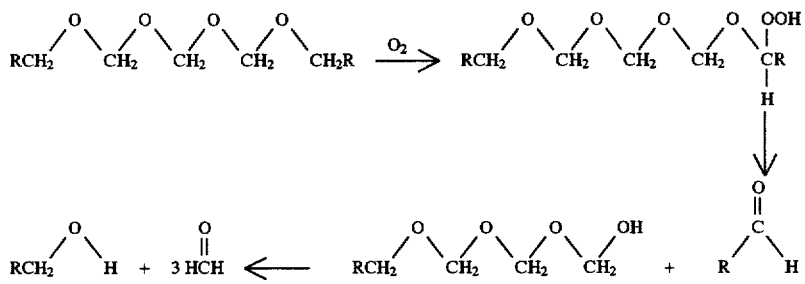

The hydroperoxide end group decomposes in turn, and splits off as an aldehyde (RCHO). The previously end-blocked chain of polyaldehydes are then open to hydrolysis, and cleaves into aldehyde molecules ($CH_2O$) and alcohol ($RCH_2OH$). The aldehyde molecules are then available for crosslinking the acetoacetate groups.

Preferred compositions typically include glycol residues where y=1 as expressed in the generic formula and 2 to 14 formaldehydes per chain. To achieve solubility in the polymer solutions, liquid compositions are preferred which limits the number of dihydroxy functional materials and formaldehydes per chain.

If it is desired to produce higher molecular weight polyaldehyde chains, for example to reduce volatility, a di-hydroxyl functional material, such as a difunctional alcohol (e.g. 1,4-butanediol) can be included with the reactants to increase the molecular weight of the polyaldehyde chain.

The compositions are believed to crosslink through a two step mechanism involving two acetoacetate groups and an aldehyde molecule. In the first step, the aldehyde reacts with an acetoacetate group via the Knoevenagel reaction to produce an alkylidene group.

In the second step, the alkylidene product of step one reacts with another acetoacetate group via Michael addition to produce a linkage through the two acetoacetate functional groups.

volatile stabilizer such as a ketone oxime or hindered aldehyde oxime. Specific examples are methyl ethyl ketone oxime, methyl butyl ketone oxime, 5-methyl-3-heptanone oxime and cyclohexanone oxime. Methyl ethyl ketone oxime is particularly useful. The exact function of the oxime in this system is unclear but it is believed to stabilize the cobalt by complex formation. After evaporation of the water or solvent, the volatile oxime is driven off and the drier activity of the cobalt is restored. The oxime stabilizer is typically used at 0.05 to 1% by weight of the film-forming composition.

GLOSSARY

The following abbreviations are used in these Examples and are to be understood as having the meaning set forth in this glossary. All percentages in these examples are percent by weight unless otherwise specified.

AAEM—acetoacetoxyethyl methacrylate
BA—Butyl acrylate
Co—cobalt
Comp.—Comparative
MAA—Methacrylic acid
MEK—methyl ethyl ketone
MMA—methyl methacrylate nDDM—n-dodecyl mercaptan
SF—soluble fraction
SR—swell ratio
THF—tetrahydrofuran
ml—milliliters
g—gram
eq.—equivalent
mg—milligram

EXAMPLES

Test Procedures

The following test procedures were used to generate the data reported in the Examples below:

MEK Rub Resistance

Films were constantly soaked with methyl ethyl ketone. Data was obtained using a crockmeter with a 2 kg weight placed on the arm for a total weight of approximately 3000 g. The test ends when the breakthrough to the panel is first observed. Data are reported as double rubs (one set of back and forth).

Film Soluble Fraction

Thin films were cast down on glass slides, a portion of the film was cut and removed from the glass slide. The samples were weighed and then soaked overnight in a container of methyl ethyl ketone. The methyl ethyl ketone mixture was filtered to drain unabsorbed MEK solution. The solvent mixture was evaporated in the oven at 150° C. for 30 minutes and the residue weighed. The soluble fraction was determined by division.

Film Swell Ratio

Thin films were cast down on glass slides and a portion of the film was cut and removed from the glass slide (soaking the glass slide in warm water for a few minutes aids film removal). The film samples were measured in two directions (length and width). The samples were then soaked for 15 minutes in methyl ethyl ketone and remeasured. The increase in each dimension was averaged to yield an average numeric value for linear swell, and the result was then cubed to yield a volumetric swell ratio.

Print

Thin films were cast down on black vinyl sheet and cured at ambient temperatures. A layer of cheesecloth was then placed over the film and covered by a rubber stopper that had a surface area of approximately one square inch. A one kilogram weight was placed on top of the stopper. The resulting test sample was then placed in an oven for the reported time at the reported temperature (typically for two hours at 60° C.) and then cooled. The print was then rated on a scale of 1 to 10 (best) according to observed ease of removal of the cheesecloth and the depth of the imprint of the film.

Block

Thin films were cast down on black vinyl sheet and cured at ambient temperatures. Two films were placed face-to-face and a one kilogram weight was placed on top. The resulting test sample was then placed in an oven typically for two hours at 60° C. and then cooled. The block was then rated on a scale of 1 to 10 (best) according to observed ease of separation of the films and film damage upon separation.

Example 1

Curing agent A was prepared by placing 108.1 grams of benzyl alcohol, 75.4 grams of paraformaldehyde, 100 grams of xylene and 1.0 grams of p-toluenesulfonic acid into a kettle equipped with a nitrogen sparge, Dean Stark trap and condenser. This mixture was heated to 80° C. for four hours, cooled and 1.0 grams of potassium hydroxide was added. The mixture was diluted with ether, filtered, washed twice with water, dried over anhydrous magnesium sulfate and the solvent removed by roto evaporation.

Curing agent B was prepared by placing 277.4 grams of p-methoxybenzyl alcohol, 181.0 grams of paraformaldehyde, and 0.1 grams of p-toluenesulfonic acid into a kettle equipped with a nitrogen sparge, Dean Stark trap and condenser. This mixture was heated to 80° C. for four hours, 150 ml of hexanes was added, the mixture was heated to reflux and water collected as the azeotrope. After water collection ceased, the mixture was cooled and 5 grams of tetrabutylammonium hydroxide was added. The mixture was diluted with ether, filtered, washed twice with water, dried over anhydrous magnesium sulfate and the solvent removed by roto evaporation.

Curing agent C was prepared by placing 184.4 grams of benzhydrol, 150.0 grams of paraformaldehyde, and 0.33 grams of p-toluenesulfonic acid into a kettle equipped with a nitrogen sparge, Dean Stark trap and condenser. This mixture was heated to 80° C. for four hours, 150 ml of hexanes was added, the mixture was heated to reflux and water collected by azeotropic distillation. After water collection ceased, the mixture was cooled and 1.7 grams of tetrabutylammonium hydroxide was added. The mixture was diluted with ether, filtered, washed twice with water, dried over anhydrous magnesium sulfate and the solvent removed by roto evaporation.

Curing agent D was prepared by placing 268.4 grams of cinnamyl alcohol, 151.0 grams of paraformaldehyde, 18.0 grams of water and 0.2 grams of methanesulfonic acid into a kettle equipped with a nitrogen sparge, Dean Stark trap and condenser. This mixture was heated to 80° C. for one hour, 10.0 grams of calcium carbonate was added and the heating continued. After three hours, 150 grams of hexanes was added, the mixture brought to reflux and water was removed by azeotropic distillation. After water collection ceased, the mixture was cooled and 100 ml of a 20% aqueous sodium hydroxide solution was added. The mixture was diluted with ether, filtered, washed twice with water, dried over anhydrous magnesium sulfate and the solvent removed by roto evaporation.

Curing agent E was prepared by placing 150.0 grams of 2,4-hexadien-1-ol, 68.7 grams of paraformaldehyde and 5.0 grams of calcium chloride into a kettle equipped with a nitrogen sparge, Dean Stark trap and condenser. This mixture was heated to 80° C. After two hours, 150 grams of hexanes was added, the mixture brought to reflux and water was removed by azeotropic distillation. After water collection ceased, the mixture was cooled and 100 grams of a 10% aqueous sodium hydroxide solution was added. The mixture was diluted with ether, filtered, washed twice with water, dried over anhydrous magnesium sulfate and the solvent removed by roto evaporation.

Curing agent F was prepared by placing 432.6 grams allyl alcohol, 301.0 grams of paraformaldehyde, 36 grams of water and 0.2 grams of methanesulfonic acid into a kettle equipped with a nitrogen sparge, Dean Stark trap and condenser. This mixture was heated to 80° C. for one hour, 10 grams of calcium chloride was added and the heating continued. After two hours, 150 grams of hexanes was added, the mixture brought to reflux and water was removed by azeotropic distillation. After water collection ceased, the mixture was cooled, diluted with ether, filtered, washed twice with water, dried over anhydrous magnesium sulfate and the solvent removed by roto evaporation.

A polymer (I) was prepared from a monomer mixture that contained 505.6 grams of water, 18.1 grams of sodium dodecyl benzene sulfonate (23% solution), 1062.9 grams of butyl acrylate, 540.0 grams of methyl methacrylate, 25.7 grams of methacrylic acid, 85.71 grams of acetoacetoxyethylmethacrylate and 3.42 grams of n-dodecyl mercaptan. From this monomer emulsion mixture, 40.0 grams was removed and added to a kettle containing a mixture of 1432.7 grams of water and 11.0 grams of sodium dodecyl benzene sulfonate (2.3% Solution) heated to 85° C. under nitrogen. An initiator charge of 2.52 grams of sodium persulfate dissolved in 84.0 grams of water was added. Ten minutes later, the remaining monomer emulsion was gradually added over a two hour period. After the two hour period, the emulsion was cooled to 60° C. and 0.8 grams of t-butyl hydroperoxide dissolved in 16 grams of water was added, followed by 0.5 grams of sodium formaldehyde sulfoxylate dissolved in 16 grams of water. The latex was cooled to ambient temperature.

A 100 gram portion of the latex was neutralized to pH=9.5 with a 28% solution of ammonium hydroxide, equilibrated overnight and readjusted to pH=9.5. To this was added 1.0 gram Triton X-405, 4.5 grams of propylene glycol and 4.5 grams of diisopropyladipate. To 10 gram aliquots of this formulated mixture was added 0.09 grams of cobalt (Intercar/Akzo) if indicated and the materials listed in the Table. These mixtures were equilibrated overnight before films were applied on glass slides using a 15 mil gate. The films were cured under ambient conditions on the laboratory benchtop. Soluble fractions of the films were measured as a function of time.

| Film | Curing Agent | Endgroup | Soluble Fractions Days: | | | |
|---|---|---|---|---|---|---|
| | | | 1 | 7 | 14 | 28 |
| 1 | none | | 96 | 93 | 85 | 88 |
| 2 | Co | | 98 | 93 | 87 | 68 |
| 3 | A (0.20 g) | benzyl | 74 | 89 | 90 | 43 |
| 4 | A + Co | | 82 | 36 | 18 | 9 |
| 5 | B (0.23 g) | p-methoxybenzyl | 43 | 35 | 26 | 17 |
| 6 | B + Co | | 26 | 19 | 13 | 11 |
| 7 | C (0.24 g) | benzhydrol | 90 | 91 | 90 | 62 |
| 8 | C + Co | | 63 | 52 | 11 | 7 |
| 9 | D (0.27 g) | cinnamyl | 14 | 11 | 7 | 5 |
| 10 | D + Co | | 11 | 8 | 5 | 5 |
| 11 | E (0.31 g) | hexadienyl | 40 | 15 | 13 | — |
| 12 | E + Co | | 35 | 8 | 9 | — |
| 13 | F (0.20 g) | allyl | 28 | 16 | 11 | 4 |
| 14 | F + Co | | 26 | 15 | 11 | 5 |

Comparative examples 1 and 2 demonstrate poor cure. Films 3–14 demonstrate improved cure according to the invention.

Example 2

Curing agent G was prepared by placing 142.2 grams of crotyl alcohol, 301.2 grams of paraformaldehyde, 88.1 grams of 2-butene-1,4-diol and 16.0 grams of calcium chloride in a flask equipped with a nitrogen sparge, reflux condenser and Dean Stark trap. This mixture was heated to 80° C. for two hours. 150 grams of hexanes was added, the mixture was heated to reflux and water was removed by azeotropic distillation. After 33.4 grams of water was removed, the reaction was cooled and 18 grams of potassium carbonate was added. After one hour, an additional 300 grams of a 5% aqueous solution of sodium sulfite was added and the mixture was equilibrated overnight. The mixture was filtered, extracted into ether, washed twice with a 5% aqueous sodium sulfite, dried over anhydrous potassium carbonate, filtered and the solvent removed by rotoevaporation to give 125 grams of liquid. NMR analysis of the product shows the starting materials are incorporated in the following ratios: crotyl alcohol (2.0)/2-butene-1,4 diol(1.2)/formaldehyde (3.7).

A two-stage polymer (II) was prepared from two monomer mixtures: the first stage consisting of 50% of the total monomers contained 415 grams of water, 48.9 grams of sodium dodecyl benzene sulfonate (23% solution), 353.3 grams of butyl acrylate, 390.0 grams of methyl methacrylate, 3.75 grams of methacrylic acid and 3.0 grams of allyl methacrylate; the second consisting of 50% of the total contained 562 grams of water, 5.5 grams of sodium dodecyl benzene sulfonate, 4.2 grams of Aerosol A-103 (American Cyanamid), 585 grams of butyl acrylate, 15.0 grams of methacrylic acid, 150.0 grams of acetoacetoxyethyl methacrylate and 15.0 grams of butyl mercaptopropionate. A 44 gram sample of the first monomer emulsion mixture was removed and added to a kettle containing a mixture of 875 grams of water, 10.75 grams of sodium dodecyl benzene sulfonate and 2.56 grams of sodium acetate heated to 85° C. under nitrogen. An initiator charge of 1.6 grams of sodium persulfate dissolved in 30 grams of water was added. Starting ten minutes later, the remaining first monomer emulsion was gradually added over 1.5 hours along with a separate catalyst feed consisting of 0.9 grams of sodium persulfate dissolved in 50 grams of water. The latex temperature was maintained for twenty minutes and then an initiator charge consisting of 1.8 grams of sodium persulfate dissolved in 160 grams of water and 3.6 grams of sodium dodecyl benzene sulfonate was added. After ten minutes, the second monomer emulsion was gradually added over 1.5 hours along with a separate catalyst feed consisting of 2.4 grams of sodium persulfate dissolved in 50 grams of water. The temperature was maintained for fifteen minutes and then 0.8 grams of t-butyl hydroperoxide dissolved in 30 grams of water was added followed by 0.5 grams of isoascorbic acid dissolved in 30 grams of water. Fifteen minutes later, 7.2 grams of a 30% solution of hydrogen peroxide diluted with 30 grams of water was added. The addition of hydrogen peroxide was repeated after ten minutes. The latex was cooled to ambient temperature.

The latex was neutralized to pH=9.5 with ammonium hydroxide (28% aqueous solution), equilibrated overnight, and readjusted to pH=9.5 again to ensure full conversion of the acetoacetate to the corresponding enamine. To 100 gram aliquots of the latex was added 0.43 grams of Triton X-405 (Union Carbide Corp.). An additives mixture was prepared consisting of 0.43 grams of Triton X-405 (Union Carbide), 0.45 grams of diisopropyladipate, 0.45 grams of propylene glycol, 0.75 grams of cobalt (Intercar/Akzo, 6% solution), 1.1 grams of a 2% aqueous Natrosol 250 MHR solution (thickener; Hercules, Inc.) and the appropriate material listed in the Table below. The additives mixture was then added to the latex and this formulated mixture was equilibrated overnight prior to film application.

Thin films were drawn down on B-1000 steel panels and glass slides using a 15 mil gate to give dried films in the thickness range of 2–3 mils. Films were cured under ambient conditions on the laboratory benchtop for the duration of the tests.

| Film | Additive | Amount | Swell Ratio | MEK Rubs 1 day | 7 day | 28 day |
|---|---|---|---|---|---|---|
| 15 | None | — | 5.4 | 15 | 10 | 10 |
| 16 | Hexenyl diethyl acetal | 3.6 g | 8.0 | 21 | 11 | 25 |
| 17 | Curing agent G | 1.5 g | 3.4 | 31 | 58 | 101 |

Film 17 demonstrates cured film properties according to the invention. Comparative example 15 and comparative example 16 which contains a non-autoxidizable acetal shows poor cured film properties.

Example 3

Curing agent H was prepared by placing 144.2 grams of crotyl alcohol, 301.2 grams of paraformaldehyde and 22.7 grams of calcium chloride in a flask equipped with a nitrogen sparge, reflux condenser and Dean Stark trap. This mixture was heated to 100° C. for six hours and the reaction was cooled. To this mixture was added 10.0 grams of sodium carbonate and the mixture was stirred for one hour. Then, 300 grams of a 10% aqueous sodium sulfite solution was added and the mixture was stirred and equilibrated overnight. The mixture was filtered, extracted into ether, washed twice with a 5% aqueous sodium sulfite, dried over anhydrous potassium carbonate, filtered and the solvent removed by rotoevaporation.

Curing agent I was prepared by an identical procedure to curing agent H from a mixture consisting of 116.2 grams of allyl alcohol, 301.2 grams of paraformaldehyde and 20.87 grams of calcium chloride.

Curing agent J was prepared by an identical procedure to curing agent H from a mixture consisting of 144.2 grams of crotyl alcohol, 301.2 grams of paraformaldehyde, 88.1 grams of 2-butene-1,4-diol and 26.7 grams of calcium chloride.

Curing agent K was prepared by placing 126.2 grams of crotyl alcohol, 300.0 grams of paraformaldehyde, 67.1 grams of trimethylolpropane and 6.9 grams of calcium chloride in a flask equipped with a nitrogen sparge, reflux condenser and Dean Stark trap. This mixture was heated to 80° C. under a nitrogen sparge for two hours. To this mixture was added 150 grams of hexanes, the mixture was heated to reflux and water was removed by azeotropic distillation. After water collection ceased, the reaction was heated to 100° C. for two hours and all distillate was collected. The reaction mixture was cooled and 3 grams of sodium carbonate was added. After one hour, an additional 100 grams of a 5% aqueous solution of sodium sulfite was added and the mixture was equilibrated overnight. The mixture was filtered, extracted into ether, washed twice with a 5% aqueous sodium sulfite, dried over anhydrous potassium carbonate, filtered and the solvent removed by rotoevaporation.

A polymer (III) was prepared from a monomer mixture that contained 507.6 grams of water, 18.7 grams of sodium dodecyl benzene sulfonate (23% solution), 771.4 grams of butyl acrylate, 831.4 grams of methyl methacrylate, 25.7 grams of methacrylic acid, 85.71 grams of acetoacetoxyethylmethacrylate, 3.42 grams of n-dodecyl mercaptan. From this monomer emulsion mixture, 40.0 grams was removed and added to a kettle containing a mixture of 1406.7 grams of water and 11.0 grams of sodium dodecyl benzene sulfonate (2.3% solution) heated to 85° C. under nitrogen. An initiator charge of 2.52 grams of sodium persulfate dissolved in 84.0 grams of water was added. Ten minutes later, the remaining monomer emulsion was gradually added over a two hour period. After the two hour period, the emulsion was cooled to 60° C. and 0.8 grams of t-butyl hydroperoxide dissolved in 16 grams of water was added followed by 0.5 grams of sodium formaldehyde sulfoxylate dissolved in 16 grams of water. The latex was cooled to ambient temperature.

To 200 grams of the latex neutralized to pH=8 with dimethylaminoethanol was added 1.0 gram Triton X-405 (Union Carbide Corp.), 1.2 grams of cobalt (Intercar/Akzo, 6% solution), and 0.02 grams of a 70% aqueous solution of t-butylhydroperoxide. To 15 gram aliquots of the latex mixture was added a premix consisting of 0.66 grams of propylene glycol, 0.66 grams of diisopropyladipate, 1.3 grams of a 2% aqueous Natrosol 250 MHR solution (thickener; Hercules, Inc.), 0.7 grams of Triton X-405 and 0.1 grams of the material listed in the Table. These mixtures were equilibrated overnight before films were applied on B-1000 steel panels using a 15 mil gate. The films were cured under ambient conditions on the laboratory benchtop.

| Film | Additive | MEK Rubs after 14 days |
|---|---|---|
| 18 | none | 8 |
| 19 | H | 60 |
| 20 | I | 40 |
| 21 | J | 67 |
| 22 | K | 60 |

Films 19–22 demonstrate cured film properties according to the invention. Comparative example 18 demonstrates poor cured film properties.

Example 4

A polymer (IV) was prepared from a monomer mixture that contained 1479.6 grams of water, 5.1 grams of a 23% solution of sodium dodecyl benzene sulfonate, 1089.4 grams of ethyl acrylate, 667.5 grams of methyl methacrylate, 25.8 grams of methacrylic acid and 198.1 grams of acetoacetoxyethyl methacrylate. In a kettle containing a mixture of 741 grams of water heated to 85° C. under nitrogen was added 21.5 grams of a 45% solids solution containing 100 nm particles of BA/MMA/MAA latex seed polymer. An initiator charge of 7.6 grams of sodium persulfate dissolved in 25 grams of water was added. The remaining monomer emulsion was gradually added over a three and one-half hour period along with 2.0 grams of sodium persulfate dissolved in 100 grams of water in a separate feed. After one hour of the feeds, an additional soap mixture was added consisting of 5.1 grams of a 23% solution of sodium dodecyl benzene sulfonate dissolved in 9 grams of water. After the feeds were complete, the temperature was held at 85° C. for 15 minutes. The latex was then cooled to ambient temperature.

A second polymer (V) was prepared according to the same procedure from a monomer mixture that contained 1479.6 grams of water, 5.1 grams of a 23% solution of sodium dodecyl benzene sulfonate, 1148.9 grams of ethyl acrylate, 707.2 grams of methyl methacrylate, 25.8 grams of methacrylic acid and 99.0 grams of acetoacetoxyethyl methacrylate.

A third polymer (VI) was prepared from a monomer mixture that contained 1479.6 grams of water, 5.1 grams of a 23% solution of sodium dodecyl benzene sulfonate, 1228 grams of ethyl acrylate, 727 grams of methyl methacrylate and 25.8 grams of methacrylic acid.

To 315.8 grams of latex neutralized with ammonium hydroxide to pH=9.5 was added 45.6 grams of butyl cellosolve, 4.8 grams of Texanol (coalescent; Texaco), 0.5 grams of Deefo 806-102 (defoamer; Ultra Adhesives), 0.6 grams of BYK 301 (mar aid; BYK-Mallinckrodt), 0.6 grams of Dow Corning Additive #14 (flow and leveling aid; Dow Corning Corp.), 28.5 grams of water, 0.6 grams of methyl ethyl ketone oxime (Exkin #2; Nuodex, Inc.) and, where noted, 5.3 grams of curing agent G. The pH was readjusted to 8.1 with ammonium hydroxide (28%). This was tumbled overnight before 2.0 grams of cobalt (Intercar, a 6% water dispersible formulation; Akzo) was added. In a separate grind, 5.4 grams of Tamol 165 (dispersant; Rohm and Haas), 16.4 grams of water, 0.7 grams of Triton CF-10 (surfactant; Union Carbide Corp.), 1.0 grams of Deefo 806-102 and 80.0 grams of titanium dioxide (Zopaque RCL-9; SCM Corporation) was placed in a Cowles Dissolver at high speed for 20 minutes and then letdown with the latex mixture.

Thin films were drawn down on B-1000 steel panels and glass slides and black vinyl sheet using an 8 mil gate to give dried films in the thickness range of 1–1.5 mils. Films were cured under ambient conditions at 70° C. at 50% relative humidity for the duration of the tests.

emulsion mixture, 49.3 grams was removed and added to a kettle containing a mixture of 1268.8 grams of water and 9.07 grams of sodium dodecyl benzene sulfonate (2.3% solution) heated to 85° C. under nitrogen. An initiator charge of 2.36 grams of sodium persulfate dissolved in 78.8 grams of water was added. Starting ten minutes later, the remaining monomer emulsion was grams gradually added over a two hour period. After the two hour period, the emulsion was cooled to 60° C. at which point 0.79 grams of t-butyl hydroperoxide dissolved in 13.1 grams of water was added followed by 0.47 grams of isoascorbic acid dissolved in 13.1 grams of water. The latex was cooled to ambient temperature.

To 200 gram aliquots of the latex was added 1.0 grams of Triton X-405 (Union Carbide Corp.) and the latex was neutralized and equilibrated to pH=9.5 with the amines listed in the Table. An additive mixture consisting of 20.1 grams of propylene glycol, 20.1 grams of diisopropyladipate, 2 grams of Triton X-405, 40 grams of water, 2.4 grams of Intercar cobalt, 2.0 grams of methyl ethyl ketone oxime and 0.4 grams (unless noted otherwise) of the curing agent listed in the Table was mixed and the latex mixture was added to it. The formulated systems were

|      |         |               | 7 days |       |       | 28 days |       |       |
|------|---------|---------------|--------|-------|-------|---------|-------|-------|
| Film | Polymer | Additive      | Swell Ratio | Print | Block | Swell Ratio | Print | Block |
| 23   | VI      | None          | soluble | 2 | 0 | soluble | 4 | 0 |
| 24   | V       | None          | 9.5    | 3 | 1 | 8.1 | 4 | 3 |
| 25   | IV      | None          | 5.5    | 4 | 1 | 6.1 | 5 | 3 |
| 26   | VI      | Curing agent G | gel   | 4 | 1 | gel | 8 | 3 |
| 27   | V       | Curing agent G | 3.9   | 6 | 2 | 3.2 | 8 | 3 |
| 28   | IV      | Curing agent G | 3.3   | 8 | 2 | 2.4 | 9 | 4 |

Comparative examples 23, 24, 25 and 26 exhibited poor properties. The films according to the invention 27 and 28 demonstrate cure in fully formulated, pigmented coatings.

Example 5

Curing agent L was prepared by placing 432.6 grams crotyl alcohol, 264.3 grams of 1,4-butanediol, 540.0 grams of paraformaldehyde and 15.0 grams of calcium chloride into a kettle equipped with a reflux condenser, Dean Stark trap and nitrogen sparge. This mixture was heated to 80° C. for two hours, 150 grams of hexanes was added, the mixture brought to reflux and water was removed by azeotropic distillation. After water collection ceased, the mixture was heated to 110° C. and all of the distillate was removed. Heating continued for two hours, the mixture was then cooled to room temperature and 30 grams of anhydrous potassium carbonate was added. The mixture was diluted with ether, filtered, washed twice with water, dried over anhydrous magnesium sulfate and the solvent removed by rotoevaporation.

Curing agent M was prepared by an identical procedure using a mixture consisting of 174.2 grams allyl alcohol, 271.1 grams of paraformaldehyde, 132.2 grams of 2-butene-1,4-diol and 1.73 grams of ferric chloride.

A polymer (VII) was prepared from a monomer mixture that contained 525 grams of water, 17.1 grams of sodium dodecyl benzene sulfonate, 971.7 grams of butyl acrylate, 415.3 grams of methyl methacrylate, 23.5 grams of methacrylic acid, 156.7 grams of acetoacetoxyethylmethacrylate, 3.13 grams of n-dodecyl mercaptan. From this monomer heat-aged for ten days at 60° C. and the soluble fraction of the latex polymer was determined in tetrahydrofuran.

| Sample | Amine | Curing Agent | S.F. (THF) |
|--------|-------|--------------|------------|
| 29 | ammonia | none | soluble |
| 30 | ammonia | L | soluble |
| 31 | ammonia | M | soluble |
| 32 | butylamine | none | soluble |
| 33 | butylamine | L | soluble |
| 34 | butylamine | M | soluble |
| 35 | isopropylamine | none | soluble |
| 36 | isopropylamine | L | soluble |
| 37 | isopropylamine | M | partially soluble |

Samples 30, 31, 33, 34, 36 and 37 demonstrate the ability to achieve one-pack stability in formulated mixtures with different amines by comparison to samples 29, 32 and 35.

Example 6

Polymers VI and IV from Example 4 were formulated as in Example 4 except where noted below. Films were cured under ambient conditions at 70° C. at 50% relative humidity for one month.

| Film | Polymer | Additive | Swell Ratio | Print | Block |
|------|---------|----------|-------------|-------|-------|
| 38 | 8 | None | 4.6 | 7 | 1 |
| 39 | 8 | Curing agent G | 2.6 | 9 | 4 |

-continued

| Film | Polymer | Additive | Swell Ratio | Print | Block |
|------|---------|----------|-------------|-------|-------|
| Heat-Aged Paints (140° F. for 10 days) then 1 month air cure ||||||
| 40 | 8 | None | 5.4 | 7 | 2 |
| 41 | 8 | Curing agent G | 3.2 | 9 | 4 |

Films 39 and 41 exhibit the improved cure properties of the invention versus the examples that are missing an element of the invention (38 and 40). Film 41 demonstrates one-pack heat aged stability.

Example 7

Curing agent N was prepared by placing 144.2 grams of crotyl alcohol, 180.0 grams of paraformaldehyde, 88.1 grams of 2-butene-1,4-diol and 5.0 grams of calcium chloride in a kettle equipped with a nitrogen sparge, Dean Stark trap and reflux condenser. This mixture was heated to 80° C. for three hours, 150 grams of hexanes was added, the mixture was heated to reflux and water was removed by azeotropic distillation. After water collection ceased, the mixture was heated to 110° C. for two hours and all distillate was collected. The reaction mixture was cooled and 10 grams of potassium carbonate was added. The mixture was diluted with ether, filtered, washed twice with water, dried over anhydrous magnesium sulfate and the solvent removed by rotoevaporation.

Curing agent O was prepared by an identical procedure to curing agent H (Example 3) using a reaction mixture consisting of 244.0 grams of s-phenethyl alcohol, 301.2 grams of paraformaldehyde and 27.3 grams of calcium chloride.

To 400 grams of polymer III (Example 3), neutralized and equilibrated to pH=9.5 with ammonium hydroxide (28%) was added 2 grams of Triton X-405, 2.4 grams of Cobalt (Intercar/ Akzo, a 6% solution) and 0.06 grams of t-butyl hydroperoxide. This was heated for 4 hours at 60° C. An additives mixture consisting of 2 grams of Triton X-405 and 20.2 grams of diisopropyladipate, 20.2 grams of propylene glycol, 40 grams of a 2% aqueous solution of Natrosol 250 MHR and 0.4 grams of methyl ethyl ketone oxime. To 40 grams of the latex mixture was added 7.2 grams of the additives mixture which contained 0.4 grams of the curing agent listed in the Table. This mixture was equilibrated overnight prior to film application on B-1000 steel panels using a 15 mil gate. A portion of the formulation was heated for 10 days at 60° C. and new films were made in a similar fashion.

| | | MEK Rubs ||
|---|---|---|---|
| Film | Curing Agent | 1 day | 28 days |
| 42 | none | 8 | 8 |
| 43 | N | 18 | 43 |
| 44 | O | 48 | 53 |
| 45 | L | 60 | 65 |
| 46 | M | 45 | 75 |
| Heat-Aged Materials ||||
| 47 | none | 8 | 8 |
| 48 | N | 21 | 41 |
| 49 | O | 38 | 76 |
| 50 | L | 40 | 52 |
| 51 | M | 24 | 70 |

Films 43–46 and 48–51 demonstrate cured film properties according to the invention. Comparative examples 42 and 47 exhibit poor cured film properties. Films 48–51 demonstrate one-pack stability.

Example 8

A two-stage polymer (VIII) was prepared from two monomer mixtures: the first stage consisting of 70% of the total monomers contained 318 grams of water, 39.8 grams of Sipon L22 (surfactant, Alcolac Inc.), 509.6 grams of butyl acrylate, 318.4 grams of methyl methacrylate, 4.9 grams of methacrylic acid, 49.0 grams of acetoacetoxyethyl methacrylate and 98 grams of styrene; the second consisting of 30% of the total contained 254 grams of water, 9.8 grams of Sipon L22, 210 grams of butyl acrylate, 42 grams of methyl methacrylate, 84 grams of methacrylic acid, 84 grams of acetoacetoxyethyl methacrylate and 14.1 grams of methyl mercaptopropionic acid. A 35 gram sample of the first monomer emulsion mixture was removed and added to a kettle containing a mixture of 1158 grams of water, 6.7 grams of Sipon L22 and 2.1 grams of sodium acetate heated to 85° C. under nitrogen. An initiator charge of 1.1 grams of sodium persulfate dissolved in 50 grams of water was added. Starting ten minutes later, a catalyst feed consisting of 3.2 grams of sodium persulfate dissolved in 100 grams of water was gradually added over a four hour feed time. The remaining first monomer emulsion was gradually added over a two hour period. The latex temperature was maintained for thirty minutes and then the second monomer emulsion was gradually added over one hour. After all the feeds were completed, the reaction was cooled to 60° C. at which point 0.8 grams of t-butyl hydroperoxide dissolved in 50 grams of water was added followed by 0.5 grams of isoascorbic acid dissolved in 50 grams of water. The latex was cooled to ambient temperature.

To 100 grams of each latex was added 0.5 grams of Triton X-405 (Union Carbide Corp.), 0.02 grams of t-butyl hydroperoxide and the latex was neutralized and equilibrated to pH=9.5 with ammonium hydroxide (28% aqueous solution). An additives mixture was prepared consisting of 1.5 grams of Triton X-405, 12 grams of diisopropyladipate, 30 grams of a 2% aqueous Natrosol 250 MHR solution (thickener; Hercules, Inc.). The materials listed in the Table below were added to 2.5 gram aliquots of the additives mix and then added to a 15 gram aliquot of the latex solution. This formulated mixture was equilibrated overnight prior to film application.

Thin films were drawn down on B-1000 steel panels using a 15 mil gate to give dried films in the thickness range of 2–3 mils. Films were cured under ambient conditions on the laboratory benchtop for the duration of the tests. In the following table, the amount of cobalt was 0.1 gram. When present, the amount of Curing Agent L was 0.2 grams.

| | | | MEK Rubs ||
|---|---|---|---|---|
| Film | Polymer | Additives | 1 day | 28 days |
| 52 | III | None | 8 | 7 |
| 53 | III | Cobalt | 20 | 48 |
| 54 | III | Cobalt + Curing Agent L | 56 | 90 |
| 55 | VIII | None | 9 | 7 |
| 56 | VIII | Cobalt | 15 | 9 |
| 57 | VIII | Cobalt + Curing Agent L | 127 | 100 |

The films according to the invention, 54 and 57, exhibit improved MEK rubs versus the Comparatives (52, 53, 55 and 56).

Example 9

Curing agent P was prepared by placing 144.2 grams of benzyl alcohol, 99.8 grams of paraformaldehyde and 11.9 grams of water into a kettle equipped with a nitrogen sparge, Dean Stark trap and reflux condenser. This mixture was heated to 80° C. for one hour after which 1.0 grams of methanesulfonic acid was added and the heating continued for three hours. Then, 150 grams of hexanes was added, the mixture brought to reflux and water was removed by azeotropic distillation. After water collection ceased, the mixture was cooled and 100 ml of a 20% aqueous sodium hydroxide solution was added and stirred for fifteen minutes. The mixture was diluted with ether, filtered, washed twice with water, dried over anhydrous magnesium sulfate and the solvent removed by rotoevaporation.

A polymer (IX) was prepared from a monomer mixture that contained 333 grams of water, 1.2 grams of Alipal CO-436 (an ammonium salt of sulfated nonylphenoxypoly (ethyleneoxy) ethanol; GAF Corp.), 1.0 grams acetic acid, 1.1 grams sodium acetate, 1429 grams of vinyl acetate, 48.1 grams of allyl acetoacetate and 14.3 grams of sodium vinyl sulfonate. To a kettle containing 700 grams of water heated to 75° C. under nitrogen was added 2 grams of acetic acid followed by 40 grams of a 45% solids, 100 nm BA/MMA/MAA latex seed polymer preform, 0.2 grams of sodium bisulfite dissolved in 10 grams of water and 0.44 grams of sodium persulfate dissolved in ten grams of water and 11.5 grams of a 0.2% aqueous solution of iron (II) sulfate. Two separate catalyst feeds were made from 1.6 grams of t-butyl hydroperoxide, 1.2 grams of sodium persulfate dissolved in 80 grams of water and one with 1.8 grams of sodium bisulfite dissolved in 82 grams of water. The monomer emulsion and catalysts were then separately added over a two and one-half hour period. The latex was then cooled to ambient temperature.

The latex was neutralized to pH=9 with ammonium hydroxide (28% solution). An additives mix consisting of 1.5 grams of Triton X-405 (Union Carbide Corp.), 6.75 grams of diisopropyladipate, 6.75 grams of propylene glycol, 8.0 grams of a 2% aqueous solution of Natrosol 250 MHR (hydroxyethylcellulose thickener; Hercules) and 7.5 grams of water was added to 150 grams of the latex. After 24 hours, the pH of the mixture was readjusted to 9.5. To 20 grams aliquots of this formulated material was added the materials listed in the Table below and the final formulations were equilibrated overnight. Thin films were drawn down on B-1000 steel panels using a 15 mil gate to give dried films in the thickness range of 2–3 mils. Films were cured under ambient conditions on the laboratory benchtop for the duration of the tests.

| Film | Additional Additives | MEK Rubs | | | |
|---|---|---|---|---|---|
| | | 1 day | 7 day | 14 day | 28 day |
| 58 | None | 10 | 20 | 36 | 46 |
| 59 | Co, 0.13 grams | 23 | 33 | 30 | 46 |
| 60 | Co + Curing agent N (0.14 g) | 50 | >100 | >100 | >100 |
| 61 | Co + Curing agent P (0.22 g) | 28 | 65 | >100 | >100 |

This series of experiments demonstrates that vinyl acetate/allyl acetoacetate copolymers can be used in the invention (60 and 61) and produces improved cure over comparative films 58 and 59.

Example 10

A polymer (XI) was prepared from a monomer mixture consisting of 253.8 grams of water, 9.0 grams of sodium dodecyl benzene sulfonate (23% aqueous solution), 801.3 grams of butyl acrylate, 12.86 grams of methacrylic acid and 42.9 grams of acetoacetoxyethyl methacrylate. A 20 gram aliquot of the monomer emulsion mixture was removed and added to a kettle containing a mixture of 716.4 grams of water, and 5.5 grams of sodium dodecyl benzene sulfonate heated to 85° C. under nitrogen. An initiator charge of 2.52 grams of sodium persulfate dissolved in 42 grams of water was added. The remaining monomer emulsion was gradually added over a two hour period. After all the feeds were completed, the temperature was maintained for sixty minutes, then the reaction was cooled to 60° C. at which point 0.4 grams of t-butyl hydroperoxide dissolved in 8 grams of water was added followed by 0.25 grams of sodium formaldehyde sulfoxylate dissolved in 8 grams of water. The latex was then cooled to ambient temperature. The latex was neutralized to pH=9.0 with ammonium hydroxide (28% solution), equilibrated overnight and readjusted to pH=9.0.

To 100 grams of latex was added 1.0 grams of Triton X-405 (Union Carbide Corp.) and 4.5 grams of propylene glycol. To twelve grams aliquots of the latex mixture was added a mixture of 0.07 grams of a 2% aqueous Natrosol 250 MHR solution (thickener; Hercules, Inc.) and the materials listed in the Table below. This formulated mixture was equilibrated overnight prior to film application.

Thin films were drawn down on glass slides using a 8 mil gate to give dried films in the thickness range of 2–3 mils. Films were dried at ambient temperatures for two hours, then heated for twenty minutes at 125° C. before testing the MEK Rub test.

| Film | Additive | Amount | MEK Rubs |
|---|---|---|---|
| 61 | none | — | 16 |
| 62 | cobalt | 0.11 g | 41 |
| 63 | cobalt + Curing agent F | 0.11 g 0.10 g | 67 |

Film 63 demonstrates cure in heated coatings. Comparative examples 61 and 62 exhibit poor cure under similar conditions.

We claim:

1. A shelf stable, air-curing composition comprising an acetoacetate functional polymer, a metal drier, and a polyformaldehyde chain endblocked with autoxidizable end groups, said polyformaldehyde chain having from 1 to 14 formaldehyde units and being liquid and soluble in the acetoacetate polymer, stored in the absence of atmospheric oxygen.

2. The composition of claim 1 in which the metal drier is complexed to an oxime or other complexing reagent that prevents substantial reaction in sealed containers in the absence of oxygen but does not prevent reaction in films.

* * * * *